(12) United States Patent
Gilliland et al.

(10) Patent No.: US 9,824,147 B1
(45) Date of Patent: Nov. 21, 2017

(54) QUERY LANGUAGE FILTER FOR CROSS-LANGUAGE INFORMATION RETRIEVAL

(71) Applicant: Google Inc., Mountain View, CA (US)

(72) Inventors: Charles Jordan Gilliland, Tokyo (JP); Sung-Jung Cho, Palo Alto, CA (US); Maureen Heymans, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 488 days.

(21) Appl. No.: 13/781,579

(22) Filed: Feb. 28, 2013

Related U.S. Application Data

(60) Provisional application No. 61/605,153, filed on Feb. 29, 2012.

(51) Int. Cl.
G06F 7/00 (2006.01)
G06F 17/30 (2006.01)

(52) U.S. Cl.
CPC .............................. *G06F 17/30864* (2013.01)

(58) Field of Classification Search
USPC ........................................................ 707/706
See application file for complete search history.

(56) References Cited

U.S. PATENT DOCUMENTS

| | | | |
|---|---|---|---|
| 8,838,437 B1 * | 9/2014 | Buryak et al. | 704/8 |
| 2007/0198484 A1 * | 8/2007 | Ahmed et al. | 707/3 |
| 2009/0112845 A1 * | 4/2009 | Byers | G06F 17/30696 |
| 2010/0180198 A1 * | 7/2010 | Iakobashvili et al. | 715/257 |
| 2011/0153577 A1 * | 6/2011 | Dean | G06F 17/30011 |
| | | | 707/693 |
| 2012/0290293 A1 * | 11/2012 | Hakkani-Tur | G06F 17/30864 |
| | | | 704/9 |

* cited by examiner

*Primary Examiner* — Muluemebet Gurmu
(74) *Attorney, Agent, or Firm* — Brake Hughes Bellermann LLP

(57) ABSTRACT

A method of processing search queries, performed by a search server system, includes receiving, from a client system, a search query and an indicia of an application language associated with an application used at the client system to perform the search query. The search server system responds by identifying a first language and a first probability factor that specifies a likelihood that the search query is in the first language. In response to satisfaction of filter criteria, comprising a determination that the first language corresponds to the application language, the search server system translates the search query to a translated search query in a second language distinct from the application language, obtains search results for the translated search query, and conveys to the client system at least a subset of the search results for the translated search query.

25 Claims, 9 Drawing Sheets

500
QUERY LANGUAGE FILTER FOR CROSS-LANGUAGE INFORMATION RETRIEVAL

RELATED APPLICATIONS

This application claims priority to U.S. Provisional Patent Application No. 61/605,153, filed Feb. 29, 2012, which is hereby incorporated by reference in its entirety.

BACKGROUND

Most people searching the World Wide Web (WWW) use search engines that are designed to help locate information stored on the billions of Web pages and other documents that are accessible via the WWW (hereinafter "documents"). Most, if not all, search engines search the WWW for documents using "search queries." Search queries can include one or more ordered words, phrases, combinations of words or phrases (hereinafter "terms," "query terms," or "search terms").

In many cases, a search query submitted in a language that is not widely used is likely to return few documents, or documents of less relevance to the search query than an equivalent query submitted in a popular language, such as English. Accordingly, improved methods of processing queries to provide improved search results, including search results translated from a language other than the language of the search query, are desirable.

On the other hand, automatic translation of queries and query results is expensive. Therefore it would be desirable to determine when such translation is unnecessary, or unlikely to be useful to the user, and in those circumstances to avoid translating the search query and search results, thereby eliminating the computational expense associated with unnecessarily translating search queries and search results.

SUMMARY

A method of processing search queries, performed by a search server system, includes receiving, from a client system, a search query and an indicia of an application language associated with an application used at the client system to perform the search query. The search server system responds by identifying a first language and a first probability factor that specifies a likelihood that the search query is in the first language. In response to satisfaction of filter criteria, comprising a determination that the first language corresponds to the application language, the search server system translates the search query to a translated search query in a second language distinct from the application language, obtains search results for the translated search query, and conveys to the client system at least a subset of the search results for the translated search query.

In other aspects of the disclosed embodiments, a search server system includes one or more processors and memory storing one or more programs for execution by the one or more processors so as to perform the method summarized above. Similarly, a non-transitory computer readable storage medium stores one or more programs having instructions, that when executed by one or more processors of a server system, perform the method summarized above.

BRIEF DESCRIPTION OF THE DRAWINGS

Like reference numerals refer to corresponding parts throughout the drawings.

DETAILED DESCRIPTION

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact unless there is an explicit statement or explanation to the contrary.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the described embodiments.

However, some embodiments may be practiced without these specific details. In other instances, well-known methods, procedures, components, and circuits have not been described in detail so as not to unnecessarily obscure aspects of the disclosed embodiments.

Figure 1:
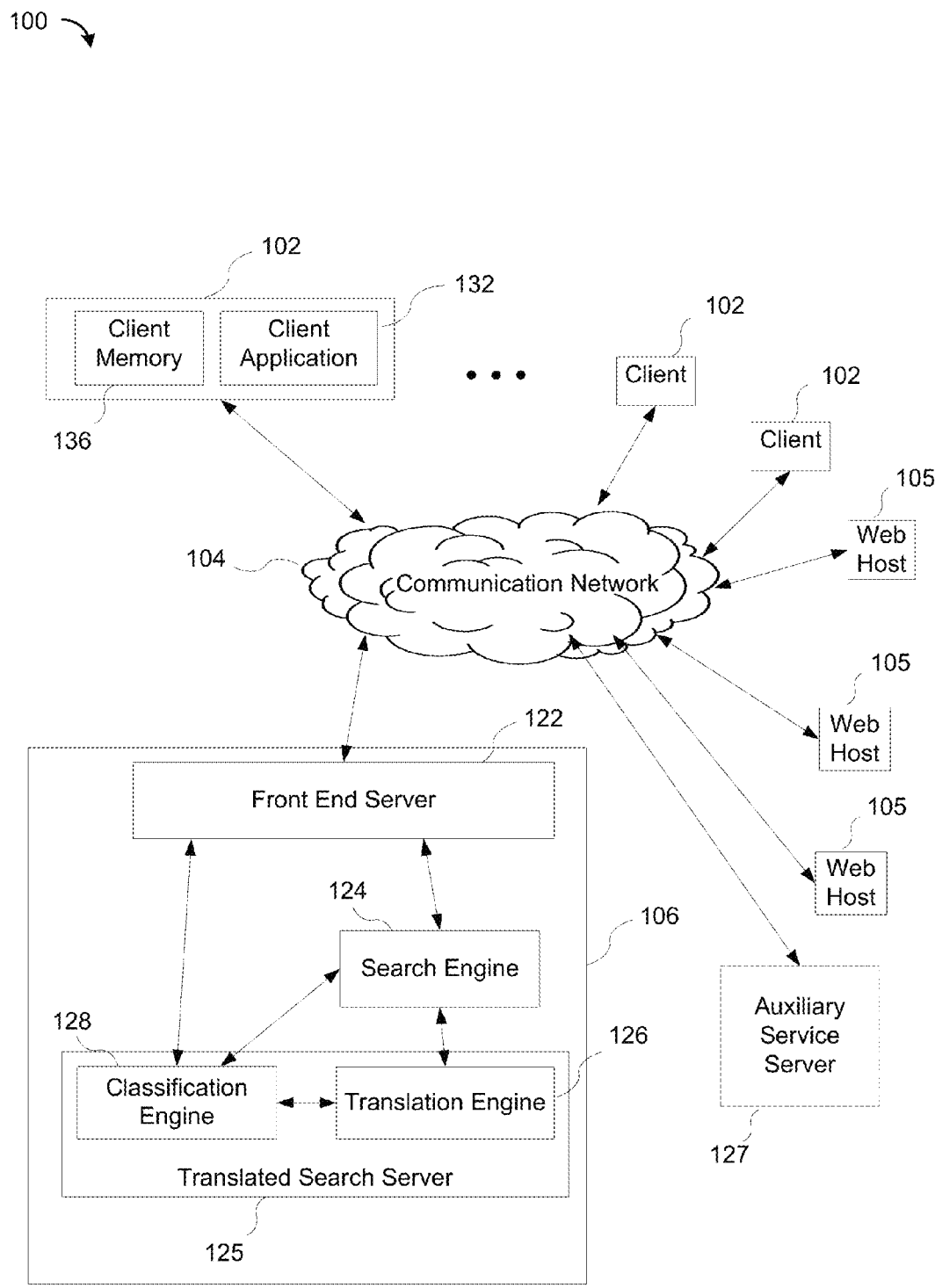
FIG. 1 is a block diagram of an environment for performing untranslated and translated search queries in accordance with some embodiments.

FIG. 1 is a block diagram of a system 100 in accordance with some implementations. One or more clients 102 are connected to a search server system 106 via a communication network 104.

A respective client 102 is any of a number of devices (e.g., a computer, an internet kiosk, a personal digital assistant, a cell phone, a gaming device, a desktop computer, or a laptop computer) and typically includes a client application 132 and client memory 136. Client application 132 is typically a software application that permits a user to interact with the client 102 and/or network resources to perform one or more tasks. In some implementations, client application 132 is a browser application (e.g., Firefox) or other type of application that provides an interface through which a user can search for, browse, and/or use resources (e.g., web pages and web services) on the client 102 and/or accessible via the communication network 104. Optionally, client memory 136 stores system information and information about a user, among other things.

Communication network 104 provides communication capability between the clients 102 and the search server system 106. In some implementations, the communication network 104 uses the HyperText Transport Protocol (HTTP) to transport information using the Transmission Control Protocol/Internet Protocol (TCP/IP). HTTP permits client computers to access various resources available via the communication network 104. Implementations described in this document, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

In some implementations, search server system 106 includes a front end server 122, a search engine 124, a translated search server 125 and, optionally, one or more auxiliary service servers 127. For ease of explanation, the front end server 122, the search engine 124 and the translated search server 125 are illustrated as part of the search server system 106 in FIG. 1. In some implementations, the search engine 124, the translated search server 125 and the front end server 122 reside on separate servers and communicate via the communication network 104. The search server system 106 optionally communicates with one or more auxiliary service servers 127 that provide additional services to the search server system 106 via the communication network 104. The auxiliary service servers 127, for example, include various services that implement various search filters or document translation services.

As discussed below with respect to FIG. 3, search engine 124 includes, or communicates with, a search index that is generated by accessing documents stored on a large number of web hosts 105 and indexing the terms in those documents. Search engine 124 also includes, or communicates with, a database of the indexed documents (hereinafter "a document database") or subsets of text generated from the indexed documents (hereinafter "a snippets database"). Similarly, in instances where auxiliary service servers 127 provide document translation services, auxiliary service servers 127 optionally communicate with document databases to translate documents stored in the document databases. Alternatively, the auxiliary service servers 127 retrieve and translate documents stored at the web hosts 105.

Front end server 122 receives search queries from, and returns search results to respective clients 102 via its connection with the communication network 104. A search query can contain any number of ordered search terms. Search results include information describing a document and the relevance of the document to a search query, such information optionally includes, without limitation, a document identifier, address of a relevant document, a title of the document and/or a snippet of text from the document.

In addition to receiving the search query from client application 132, front end server 122 further receives information describing client application 132. This information includes an indicia of the language associated with the user interface of client application 132 (hereinafter "application language"). For example, front end server 122 receives indicia that the application language is French, which indicates that the user interface displays search options and other user interface information in French. In some implementations, the indicia of the language associated with the user interface is optionally based on preferences specified by the user. In some implementations, front end server 122 also receives indicia of the locale (hereinafter the "client locale") where the client 102 that sent the search query is operated. A client locale, as used herein, is any defined geographic territory, such as a country, a province, a state, a county, a city or a town. In most implementations and in the implementations discussed herein, the client locale is a country.

Front end server 122 is communicatively coupled to search engine 124 and translated search server 125. Front end server 122 transmits search queries to both search engine 124 and translated search server 125. While search engine 124 executes the search query without regard to the application language and client locale, translated search server 125 also executes the search query when (e.g., in accordance with a determination that) certain filter criteria are satisfied. If the filter criteria are satisfied, translated search server 125 translates the search query into a second language (herein referred to as a "target language"), obtains search results that are in the target language, and then translates search result information (e.g., document identifiers, document snippets, document metadata, etc.) from the target language back into the application language. These processes are described in detail below with respect to FIGS. 4A-4B.

The filter criteria include a classification as to whether the search query is in the application language or another language. This classification is performed by classification engine 128 and serves as a proxy for a determination of whether the user of client application 132 is multilingual and wishes to receive search results in a different language than the application language. For example, a user in France using a French search engine interface who submits a search query in Spanish is presumed to be literate in Spanish and is presumed to be requesting search results that are in Spanish. By identifying received queries that are in languages that are not in the same language as the application language, a determination is made that the user wishes to see results in the other language (i.e., the language of the received search query) and therefore the search query is not translated and executed in the target language. The determination that translation is unnecessary eliminates the computational expense associated with unnecessarily translating search queries and search results.

The probability that a user wishes to view search results in a language other than the application language is typically dependent on both the application language and the location of the user, also called the client locale. For example, a user using an English interface in Canada is more likely to want to receive French search results, in addition to English search results, than a user using an English interface in Peru. Accordingly, in some implementations, classification engine 128 adjusts the classification of the search query based on the application language and the client locale from which the search query was received.

Both search engine 124 and translated search server 125 transmit search results to front end server 122, which in turn, conveys the search results to client application 132 at the client 102 that submitted the search query. In some implementations, front end server 122 evaluates the search results prior to conveying the results to the client application 132 in order to determine whether to combine the translated search results received from translated search server 125 and the results received from search engine 124. This evaluation is discussed in detail below with respect to FIG. 4B.

In some embodiments, the search server system 106 contains a subset or superset of those elements illustrated in FIG. 1. Although FIG. 1 shows the search server system 106 as a number of discrete items, this figure is intended more as a functional description of the various features of search server system 106 than as a structural schematic of the various embodiments. In practice, and as recognized by those of ordinary skill in the art, items shown separately could be combined and some items could be further divided into sub-elements or parallel elements. For example, some separate elements in FIG. 1 could be implemented by a single server and some single items could be implemented by one or more servers or modules. The actual number of servers in search server system 106 and how features are allocated among the servers will vary from one implementation to another, and optionally depends in part on the amount of traffic that the system must handle during peak usage periods as well as during average usage periods. For example, translated search server 125 and search engine 124 are typically implemented using a large number of servers because search server system 106 handles a large number of search queries.

Figure 2:
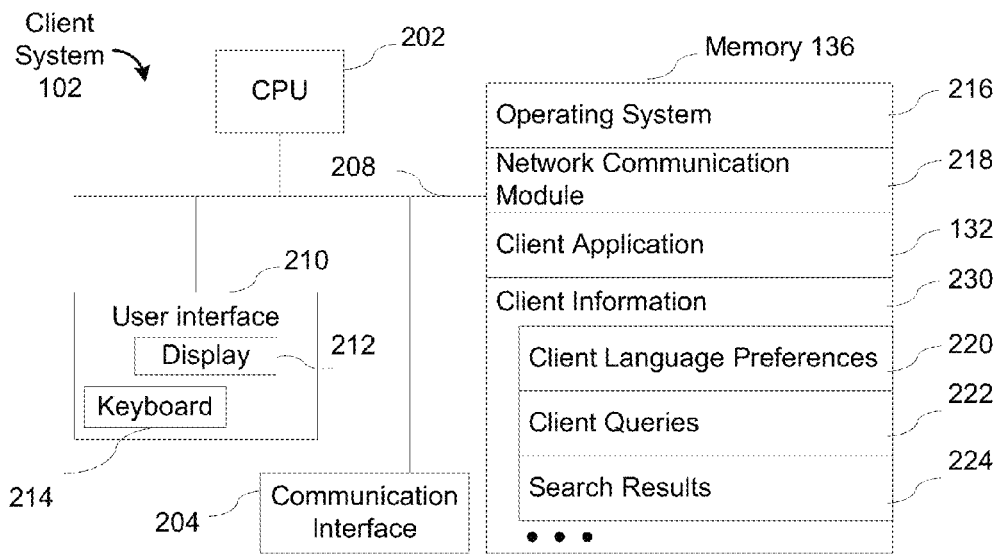
FIG. 2 is a block diagram of a client in accordance with some embodiments.

FIG. 2 is a block diagram illustrating a client 102 in accordance with some implementations. The client 102 typically includes one or more processing units (CPUs) 202, one or more network or other communications interfaces 204, memory 136, and one or more communication buses 208 for interconnecting these components. Communication buses 208 optionally include circuitry (sometimes called a chipset) that interconnects and controls communications between system components. The client 102 includes a user interface 210 comprising a display device 212 and a keyboard 214 and/or other user input mechanism(s) (e.g., a touch screen or other touch sensitive surface). Memory 136 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 136 optionally includes one or more storage devices remotely located from the CPU(s) 202. Memory 136, or alternately the non-volatile memory device(s) within memory 136, comprises a non-transitory computer readable storage medium. In some embodiments, memory 136, or the computer readable storage medium of memory 136 stores the following programs, modules and data structures, or a subset thereof:

In some embodiments, the memory 136 stores the following programs, modules and data structures, or a subset thereof:

an operating system 216 that includes procedures for handling various basic system services and for performing hardware dependent tasks;

a network communication module 218 that is used for connecting the client 102 to other computers via the one or more communication network interfaces 204 and one or more communication networks, such as the Internet, other wide area networks, local area networks, metropolitan area networks, and so on;

a client application 132 that permits a user to perform search queries and receive search results as described above; and client information 230 such as client language preferences 220 and cached information from the client application such as search queries 222 and search results 224; in some implementations client information 230 is anonymized, and/or does not include personally identifiable information, and does not include an identifier uniquely associated with the user or a user name.

Each of the above identified modules, applications or programs corresponds to a set of instructions, executable by the one or more processors of client 102, for performing a function described above. The above identified modules, applications or programs (i.e., sets of instructions) need not be implemented as separate software programs, procedures or modules, and thus various subsets of these modules are typically combined or otherwise re-arranged in various embodiments. In some embodiments, memory 136 optionally stores a subset of the modules and data structures identified above. Furthermore, memory 136 optionally stores additional modules and data structures not described above.

Figure 3:
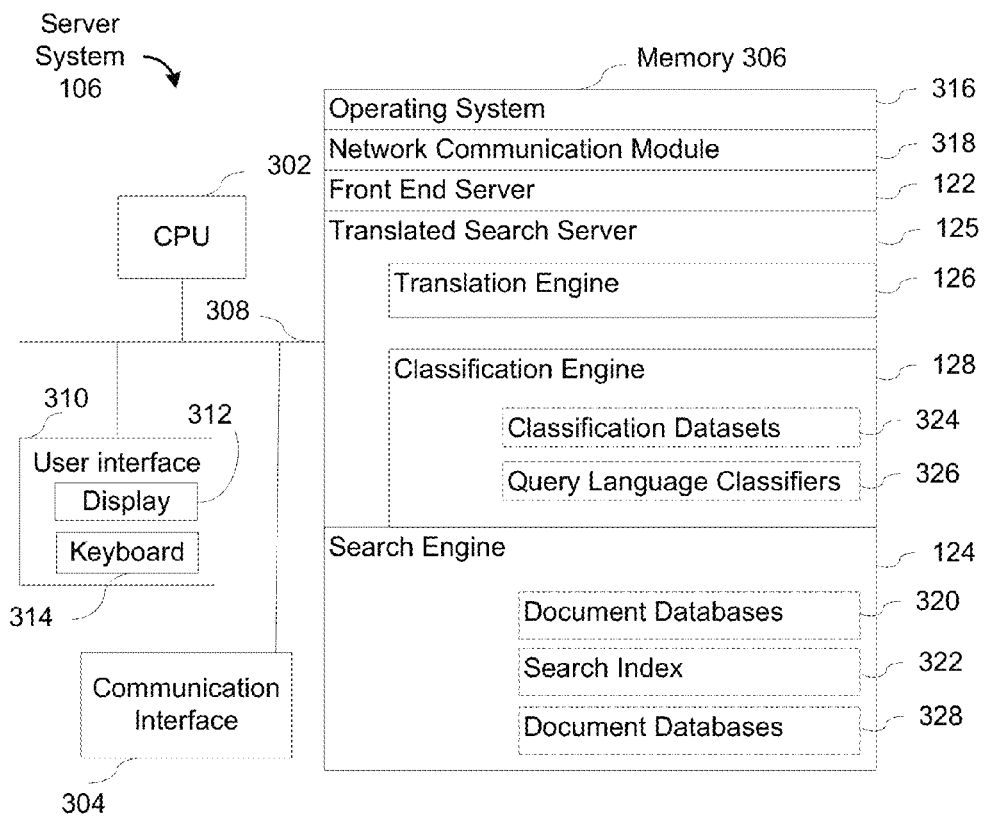
FIG. 3 is a block diagram of a search server system in accordance with some embodiments.

FIG. 3 is a block diagram illustrating search server system 106 in accordance with some embodiments. Search server system 106 typically includes one or more processing units (CPUs) 302, one or more network or other communications interfaces 304, memory 306, and one or more communication buses 308 for interconnecting these components. Communication buses 308 optionally include circuitry (sometimes called a chipset) that interconnects and controls communications between system components. Search server system 106 optionally includes a user interface 310. If included, user interface 310 typically has a display device 312 and one or more user input mechanisms, such as a keyboard 314, mouse, and/or touch sensitive surface. Memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternately the non-volatile memory device(s) within memory 306, comprises a non-transitory computer readable storage medium. In some embodiments, memory 306, or the computer readable storage medium of memory 306 stores the following programs, modules and data structures, or a subset thereof:

an operating system 316 that includes procedures for handling various basic system services and for performing hardware dependent tasks;

a network communication module 318 that is used for connecting the search server system 106 to other computers via the one or more communication network interfaces 304 and one or more communication networks 104, such as the Internet, other wide area networks, local area networks, metropolitan area networks, and so on;

a front end server 122 as described above to receive search queries and other information from clients 102 and transmit search results for the search queries to clients 102;

a translated search server 125 as described above, including a translation engine 126 and a classification engine 128. The translation engine 126 is used to translate document search queries, document identifiers, document snippets (e.g., also called search result snippets), document metadata, and, optionally, documents. The classification engine 128 is used to classify search queries and optionally includes query language classifiers 326 and classification datasets 324 used to train the query language classifiers 326; and a search engine 124, as described above, optionally including a search index 322, one or more document databases 320 and one or more snippet databases 328. In alternative embodiments, the document databases 320 and snippet databases 328 are external to, and communicatively coupled with, the search engine 124.

Each of the above identified modules, applications or programs corresponds to a set of instructions, executable by the one or more processors 302 of search server system 106, for performing a function described above. The above identified modules, applications or programs (i.e., sets of instructions) need not be implemented as separate software programs, procedures or modules, and thus various subsets of these modules are optionally combined or otherwise re-arranged in various embodiments. In some embodiments, memory 306 optionally stores a subset of the modules and data structures identified above. Furthermore, memory 306 optionally stores additional modules and data structures not described above.

Methods 400, 500, 600 and 700, discussed below with respect to FIGS. 4A-4B, 5, 6, and 7, are governed by instructions stored in memory 306, sometimes called computer memory or a non-transitory computer-readable storage medium, of the one or more servers in search server system 106. Stated another way, respective server-side operations shown in the flow charts of FIGS. 4A-4B, 5, 6, and 7 correspond to computer readable instructions stored in memory 306 of the one or more servers in search server system 106. Some operations, such as receive and transmit operations, are performed in part by communication interface 304, and in part by execution of computer readable instructions in memory 306 or the non-transitory computer readable storage medium of memory 306. The computer readable instructions stored on the computer readable storage medium are in source code, assembly language code, object code, or other instruction format that is executed or interpreted by one or more processors.

Although FIG. 3 shows a search server system 106, FIG. 3 is intended more as functional description of the various features which are optionally present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a search server system 106 and how features are allocated among them will vary from one implementation to another, and, optionally, depends in part on the amount of data traffic that the system must handle during peak usage periods as well as during average usage periods.

Figure 4A:
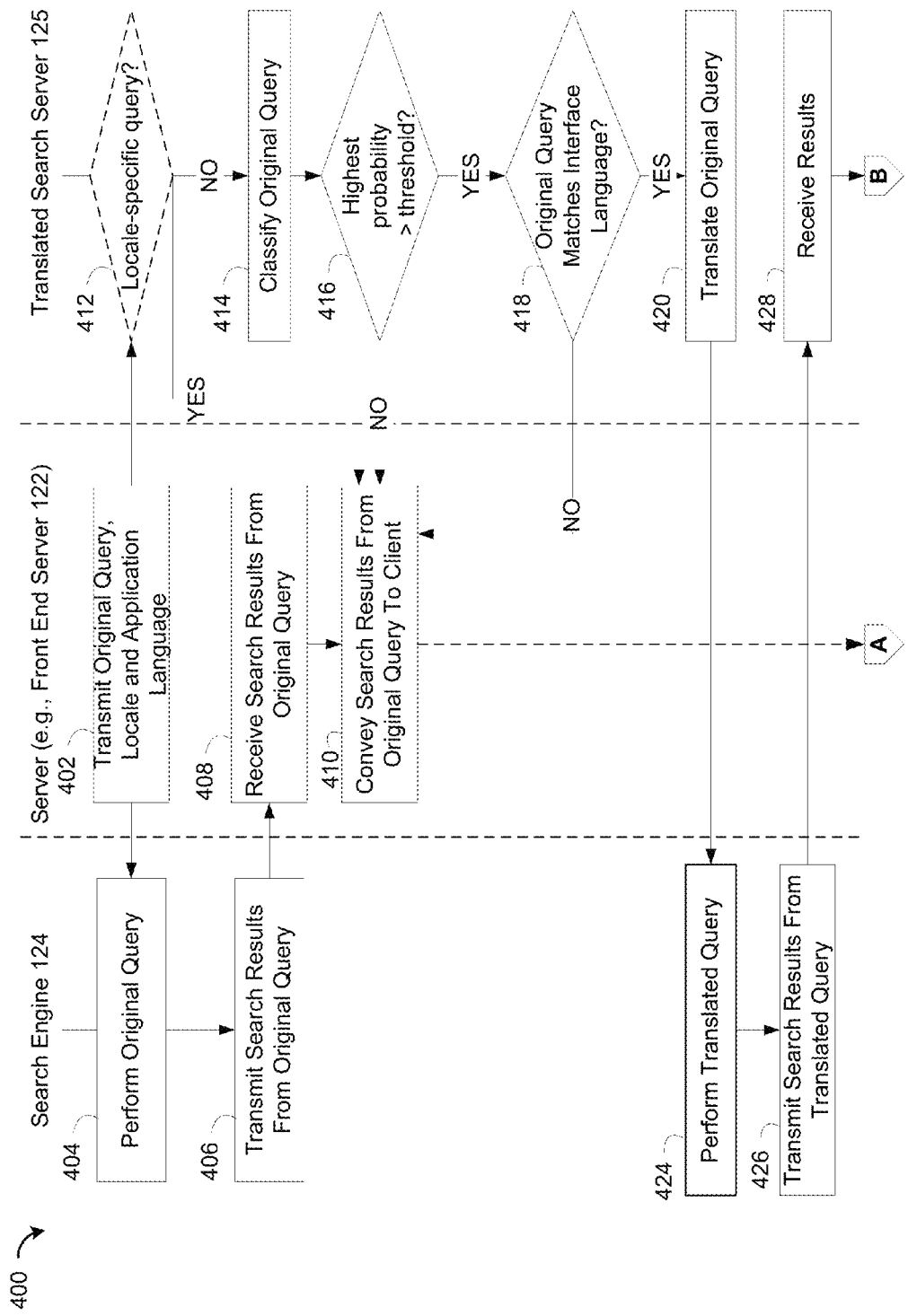
FIGS. 4A and 4B are flow diagrams of a process for providing search results for untranslated and translated search queries in accordance with some embodiments.
Figure 4B:
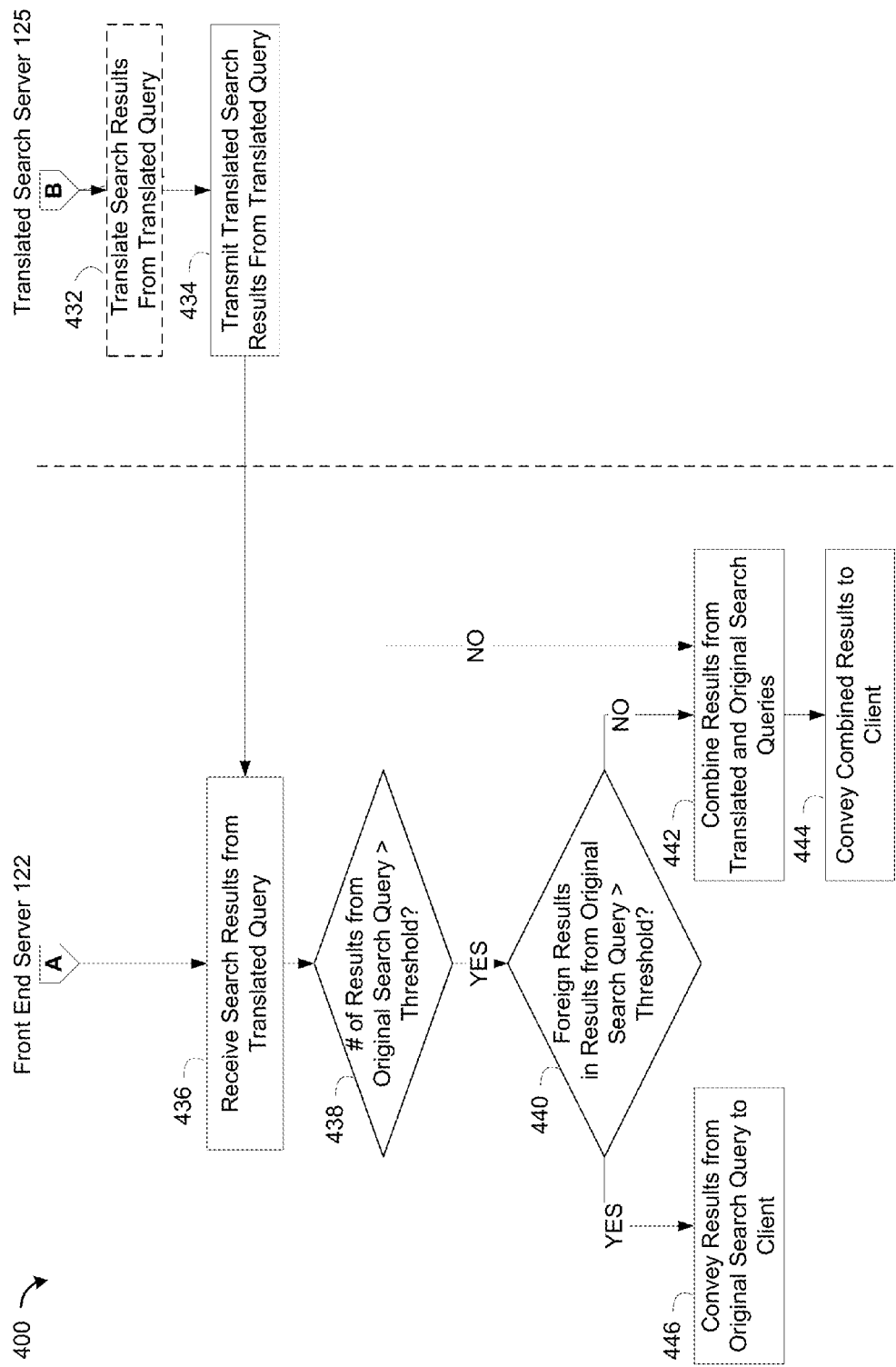

FIGS. 4A-4B are flowcharts illustrating a method 400 performed by the search server system 106 to produce and provide to a requesting client system search results, including search results generated from translated and untranslated search queries. FIGS. 4A-4B illustrate a sequence of operations, as well as a flow of information between the search engine 124, a server (e.g., the front end server 122) and the translated search server 125, according to some implementations. In some implementations, different sequences of operations are performed or different entities practice the operations of method 400.

Attention is now directed to FIG. 4A in which a server (e.g., front end server 122) transmits (402) a search query (hereinafter the "original query") received from client application 132 (at a respective client 102) to search engine 124 and translated search server 125. In addition to the original query, front end server 122 also transmits (402) the application language and client locale associated with the client application 132 from which the original query was received.

In response to receiving the search query, search engine 124 processes (404) the search query by executing the search query against one or more document databases 320 to identify relevant search results. In some embodiments, processing the search query at search engine 124 includes identifying relevant document databases 320 to search based on the client locale and the application language, and potentially other criteria as well. Optionally, the search results include document identifiers for respective search results, titles of the documents corresponding to the document identifiers, snippets of text from the documents (e.g., snippets of text related to or that include one or more query terms from the received search query), and document metadata. In one aspect, the document identifiers are uniform resource locators (URLs) or other addresses used to access the documents. In some implementations, the document identifiers are links that, when selected, direct the client application (or another application at the client 102) to access the corresponding document. Search engine 124 transmits (406) the search results for the original query to the front end server 122. The front end server 122 receives (408) from search engine 124 the search results for the original query.

In response to receiving the original query, the translated search server 125 makes an optional determination (412) of whether the original query that seeks search results associated with the client locale from which the original query was received (herein referred to as a "local search query" or "locale-specific query"). A locale-specific query need not include any geographic identifiers. Typically, locale-specific queries contain keywords strongly associated with requests for information about entities (businesses, people, organizations, etc.) or conditions (e.g., weather, traffic) near the client locale (e.g., the user's current location), and do not contain geographic identifiers inconsistent with the client locale. In some embodiments, this determination is made based on presence or absence, in the received search query, of geographic identifiers consistent with or inconsistent with the client locale, as well as query terms in a predefined whitelist of terms (e.g., "weather," "traffic," "restaurant") associated with locale-specific queries. For example, in some implementations, when a received search query includes a geographic identifier inconsistent with the client locale, the search query is determined not to be a locale-specific query. In another example, in some implementations, when the search query does not contain any geographical term, and includes a query term in the predefined whitelist, the determination is made that search query is a locale-specific query. When a determination is made that the original query is a locale-specific query (412—Yes), the translated search server 125 communicates indicia of that determination to front end server 122. In response to receiving indicia that the search query is a locale-specific query, front end server 122 conveys (410) search results from the original query to the client application 132 without conveying translated search results.

In response to a determination (412—No) that the query is not a locale-specific query, the translated search server 125 applies a classifier (414) to the original query to determine a probability factor associated with the likelihood that the original query is in the application language. In some implementations, the likelihood that the original query is in a language other than the application language is used as a proxy of the likelihood that the user is literate in the other language and/or wishes to see search results in that other language.

The classifier will typically produce one or more probability factors, where each probability factor is associated with the likelihood that the original query is in a corresponding language. In some embodiments, the classifier produces only a single probability factor, representing the highest likelihood that the original query is in a particular (identified) language associated with the probability factor. As discussed in detail below with respect to FIGS. 5 and 6, in some implementations, the classifier weights the probability factors based on the application language and, optionally, the client locale and/or a combination of the application language and the client locale. The classifier optionally weights the probability factors during or after classification.

In some instances, if the probability factor that indicates the highest likelihood that the original query is in a given language (hereinafter the "best language match") still has a weak likelihood, this suggests that the search query contains words or characters that don't correspond to any particular language. In these instances, it is inferred that translating the original query would not produce any better or more comprehensive search results. Accordingly, in some implementations, translated search server 125 evaluates the probability factors to determine (416) whether the best language match exceeds a specified or predefined threshold value (e.g. 50%, 60%, or 70% probability). If translated search server 125 makes a determination (416—No) that the best language match is below the specified or predefined threshold value, translated search server 125 communicates indicia of the determination that the original query has no strong language match to the front end server 122. In this circumstance, front end server 122 conveys the search results from the original query to the client application 132 without conveying translated search results.

On the other hand, in response to a determination (416—Yes) that the best language match exceeds the predefined value, translated search server 125 determines (418) whether the best language match corresponds to the application language (i.e., whether the original query is in the application language).

If the best language match does not correspond to the application language (418—No), then indicia of the determination that the original query is in a language other than the application language is transmitted to the front end server 122. In response to receiving indicia of the determination that the original query is in a language other than the application language, front end server 122 conveys (410) the search results from the original query to the client application 132, but does not convey translated search results.

In response to a determination that the best language match corresponds to application language (418—Yes), the translated search server 125 translates (420) the original query into a target language. The target language is identified in a number of ways in various implementations. For example, in some implementations, the default target language is English. In another example, the target language is determined based on the client locale. For example, in locales in which business is often conducted in a second language, or that has a large population of speakers of the second language, the target language may be set as that second language.

In another example, for some users, the application language is not the same as the primary language spoken at the client locale. For example, even though the particular user is located in the United States or other location with a primary language of English, the application language of the client application for the particular user is Mandarin, Vietnamese, Russian, or other language spoken by the user. In some implementations, in this circumstance, translation operation 420 (FIG. 4A) translates the original query into the primary language for the client locale.

In some implementations, translated search server 125 translates (420) the original query and transmits the translated search query to search engine 124 for processing. Search engine 124 performs/executes (424) the translated search query to generate a set of search results and transmits (426) the search results for the translated search query to translated search server 125. Translated search server 125 receives (428) the search results for the translated search query from search engine 124.

Attention is now directed to FIG. 4B, which illustrates additional aspects of method 400. Prior to transmitting (434) the search results for the translated search query to front end server 122, translated search server 125 typically translates (432) the search results from the translated search query into the application language. Translated search server 125 optionally translates the search results, or a portion of the search results, for example a title of a document listed in the search results and a snippet of that document.

In some implementations, in response to receiving (436) the translated search results for the translated search query, front end server 122 performs one or more determinations prior to conveying the search results to client 102. In some of these implementations, the front end server 122 determines (438) whether the number of search results from the original search query exceeds a threshold number (e.g. 5, 6, 7, 8, 9, 10). If the outcome of this determination is that the number of search results from the original search query is "low" (does not exceed threshold number), then front end server 122 combines (442) the search results from the original search query and translated search query and conveys (444) the combined search results to the client 102.

If the front end server 122 determines (438) that the number of search results from the original search query exceeds the defined threshold value (or if optional determination 438 is not performed), front end server 122 proceeds to determine (440) whether the proportion of foreign language results (i.e., search results that are not in the application language) in the results from the original search query exceeds a predefined threshold (e.g. 50%, 60%, or 70%). This analysis can be thought of as a "second pass" to determine whether the original search query is in a language other than the application language. If a large number of the results for a search query are foreign language results, it can be inferred that the person who issued the search query wishes to see foreign results instead of translated results. Thus, if the proportion of foreign results in the search query exceeds the defined threshold value, front end server 122 conveys (446) the search results from the original search query to the client 102 without conveying translated search results.

If the proportion of foreign results in the search query is less than the defined threshold value, then the front end server 122 combines (442) search results from the translated and the original search queries and conveys (444) the combined search results to the client 102.

Figure 5:
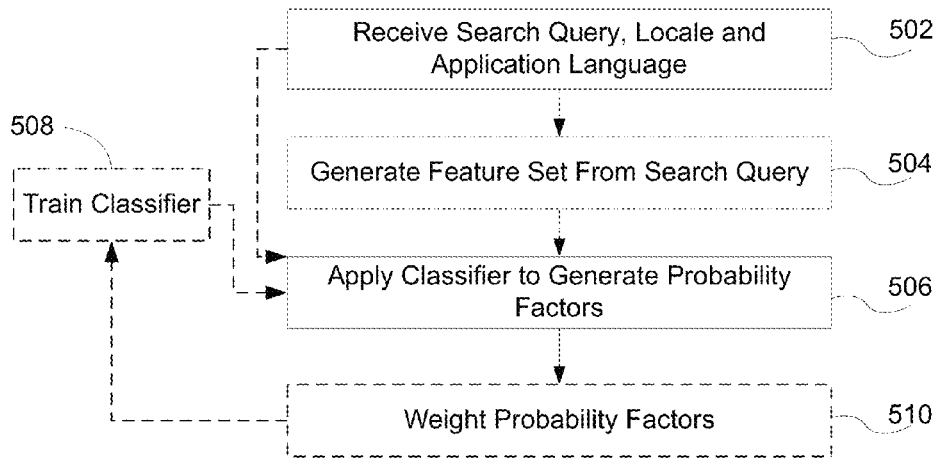
FIG. 5 is a flow diagram for a server process for classifying search queries, in accordance with some embodiments.

FIG. 5 is a flowchart representing a server method 500 for classifying search queries in accordance with some embodiments. The search server system 106 receives (502) from a respective client 102 a search query, a client locale associated with the respective client 102 and an application language associated with the respective client 102. In some embodiments, the search server system 106 preprocesses the search query to generate (504) a set of features used to classify the search query. The search server system 106 optionally preprocesses the search query using a number of natural language programming techniques such as filtering of commonly used terms, stemming and/or spelling correction, prior to classifying the search query. Additionally, the search server system 106 optionally segregates the terms in the search query in different ways to generate (504) a feature set used to classify the search query. In some embodiments, the search server system 106 segregates the search terms into n-grams (e.g., bigrams, trigrams) according to the ordered set of search terms in the search query. Generating n-grams is described in detail below with respect to FIG. 6. In other embodiments, the set of features is simply an unordered set of individual search terms included in the search query (i.e. a "bag of words" technique).

In some embodiments, search server system 106 applies (506) one or more classifiers to the set of features derived from the search query to generate a set of probability factors. A classifier, as used herein, is a statistical model that specifies a method or formula for combining feature data to generate a probability factor (e.g., a formula that assigns different weights to individual features or combinations of features used to generate the probability factor). Each probability factor indicates a likelihood that a search query is in a respective language. According to some embodiments, the probability factor optionally also indicates the likelihood that the search query is associated with a locale.

In some embodiments, search server system 106 trains (508) the classifier. Training (508) a classifier is the process of identifying the method or formula used to generate the probability factors based on data from search queries for which the language(s) of the search query is known (i.e., training data). In some embodiments, the training of the classifier is performed "offline," by a system other than search server system 106, using previously classified search queries.

In some embodiments, the search server system 106 further functions to weight (510) or adjust the probability factors based on the application language and/or client locale. For example, in some embodiments, the search server system 106 weights (510) or adjusts the probability factors to indicate a greater likelihood of the search query being in the application language, and/or in any of the languages associated with (e.g., commonly used at) the client locale. In embodiments where the application language and client locale are included as features of the search query (i.e., as features in the generated feature set produced by operation 504) prior to applying the classifier, the probability factors are determined by the classifier in accordance with the application language and the client locale, as well as the other features in the generated feature set, and thus operation 510 is not used. In embodiments where the application language is included as a feature of the search query (i.e., as a feature in the generated feature set produced by operation 504) prior to applying the classifier, the probability factors are determined by the classifier in accordance with the application language, as well as the other features in the generated feature set, and thus operation 510 weights or adjusts the probability factors based on the client locale. In embodiments where the client locale is included as a feature of the search query (i.e., as a feature in the generated feature set produced by operation 504) prior to applying the classifier, the probability factors are determined by the classifier in accordance with the client locale, as well as the other features in the generated feature set, and thus operation 510 weights or adjusts the probability factors based on the application language.

Figure 6:
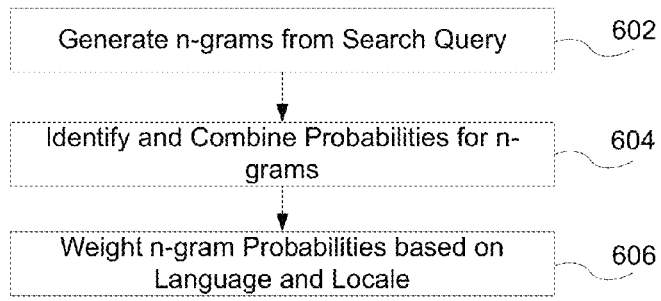
FIG. 6 is a flow diagram for a server process for classifying search queries, in accordance with some embodiments.

FIG. 6 is a flowchart representing a server method 600 for classifying search queries in accordance with some implementations. The search server system 106 receives the search query, the application language and the locale as illustrated in FIG. 5. The search server system 106 generates (602) a set of n-grams. In some embodiments, the search server system 106 generates (602) a set of bigrams and/or trigrams from the search query. In some embodiments, the set of bigrams and trigrams are obtained using a "sliding window" technique in which the n-grams are generated by sequential identifying every possible bigram, trigram or n-gram in an ordered search query. In some embodiments, the set of n-grams are generated (602) by generating different combinations of bigrams, trigrams from an unordered search query and selecting all or some of the search terms.

The search server system 106 applies a classifier to identify (604) probabilities specific to each n-gram and to combine (604) the probabilities to generate probability factors for one or more languages. In some implementations, a probably factor is produced for each language of a predefined set of languages. For example, the probabilities identified by the classifier for respective n-grams are optionally derived from a training set of search queries for which the language of each search query is known. In some implementations, the search server system 106 weights (606) the generated probability factors based on the application language and client locale.

Figure 7:
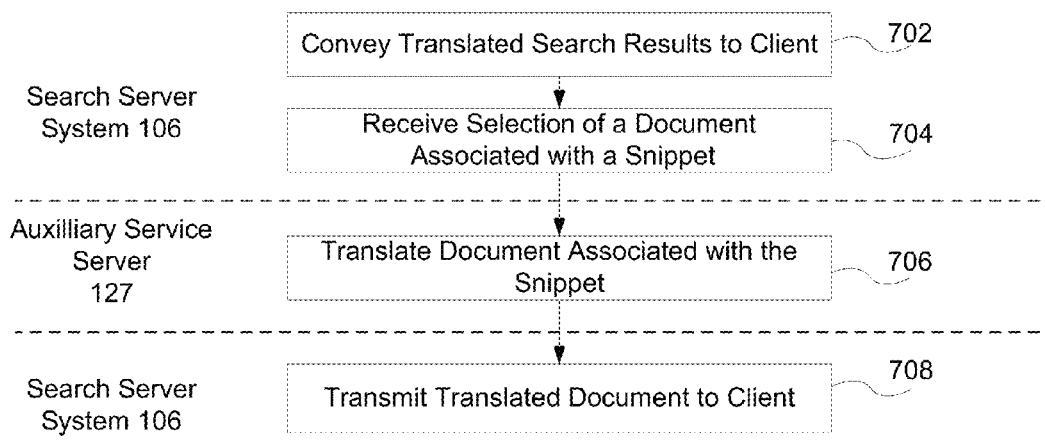
FIG. 7 is a flow diagram for a server process for conveying translated documents, in accordance with some embodiments.

FIG. 7 is a flowchart representing a server method 700 for classifying search queries in accordance with some embodiments. Search server system 106 conveys (702) translated search results (e.g. translated document titles and translated snippets) from a translated search query to the client application 132. The search server system 106 receives (704), from a respective client 102, a user selection of a translated search result in conjunction with indicia of the application language. Stated another way, when the user clicks on or otherwise selects a translated search result, search server system 106 receives the user selection and an indicia of the application language. User selection of a search result typically occurs when the user selects a link in the search results corresponding to one of the search results; the link typically includes a translated document title and/or a translated snippet from the document identified by the search result. In response to user selection of the link, auxiliary services server 127 translates (706) the document into the application language. Search server system 106 or auxiliary services server 127 transmits (708) the translated document to the client 102 for display in the client application 132.

Figure 8A:
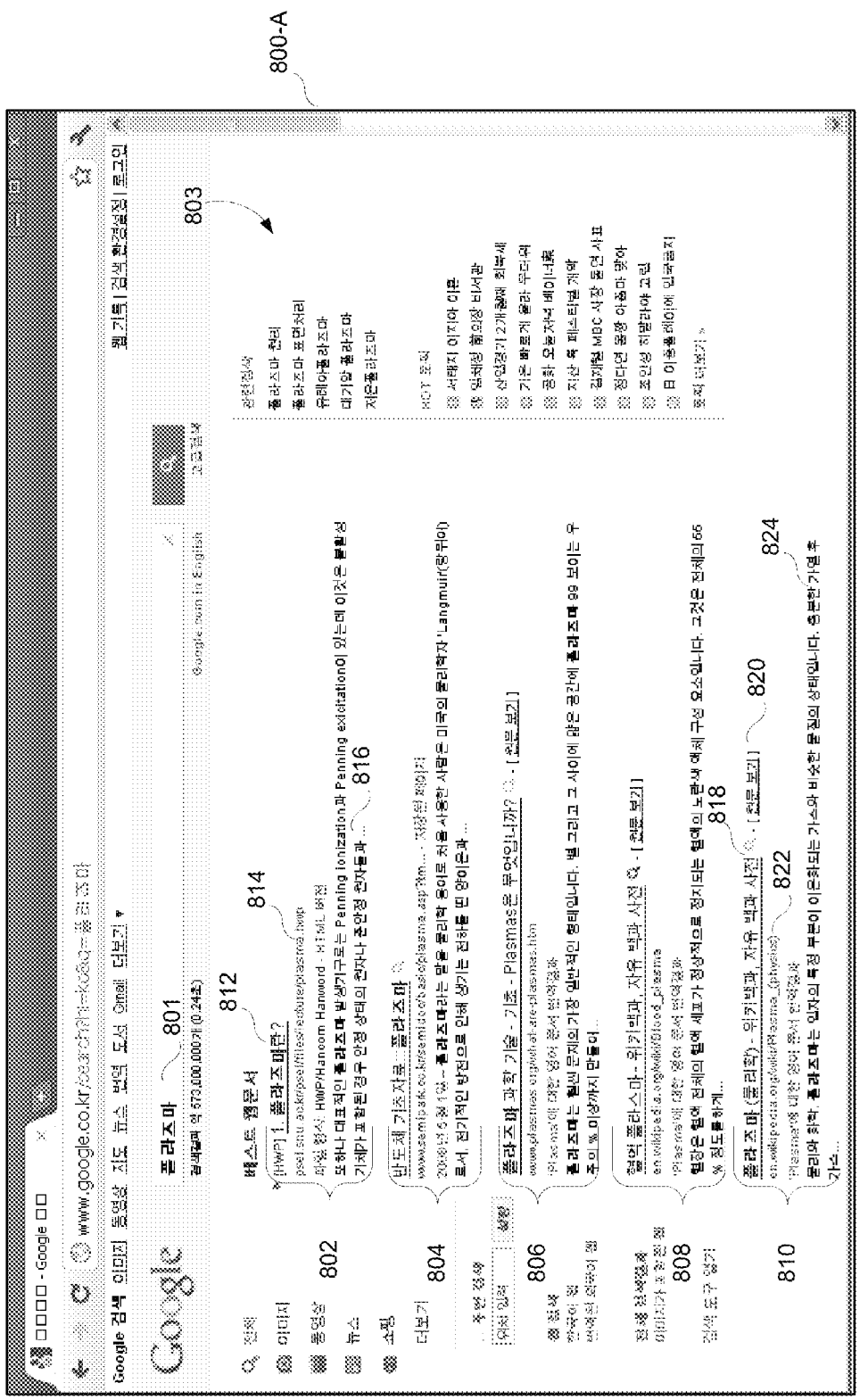
FIGS. 8A-8D illustrate interfaces for displaying translated and untreated search results and documents represented in the search results, in accordance with some embodiments.

FIG. 8A illustrates an example of a user interface 800-A displaying a search result document 803 that includes a set of search results 802, 804, 806, 808, 810 derived from the original and translated search queries. The search results are typically encoded using HyperText Markup Language (HTML), XML, or any other appropriate markup language or encoding scheme, and then rendered by the client application 132. When a user submits a search query through client application 132 to search server system 106, the search server system 106 retrieves the search query and the application language, performs searches for the search query and, in some instances, a translated search query and conveys the search results back to client application 132.

Client application 132 receives and displays the search results in user interface 800-A. User interface 800-A includes indicia of the search query ("plasma" in Korean) that was performed 801, in addition to links 812, 818, addresses 814, 822 and text 816, 824 representing search results for the search query 802, 804, 806, 808, 810. In the user interface 800-A illustrated, both search results from the original 802, 804 and translated search query 806, 808, 810 are displayed in the user interface 800. In some instances, search results from the original search query include search results that are in the application language 802, 804 and search results that are in a foreign language (not shown).

The search results (i.e., document snippets and document titles) from the translated search query are typically translated back into the application language and displayed in the application language. In the example illustrated, the Korean search query for "plasma" has been translated into English and a set of search results from the translated search query 806, 808, 810 referencing documents that are in English are presented in the user interface 800-A. The document title 818 and snippet 824 representing the search results have been translated into Korean.

Figure 8B:
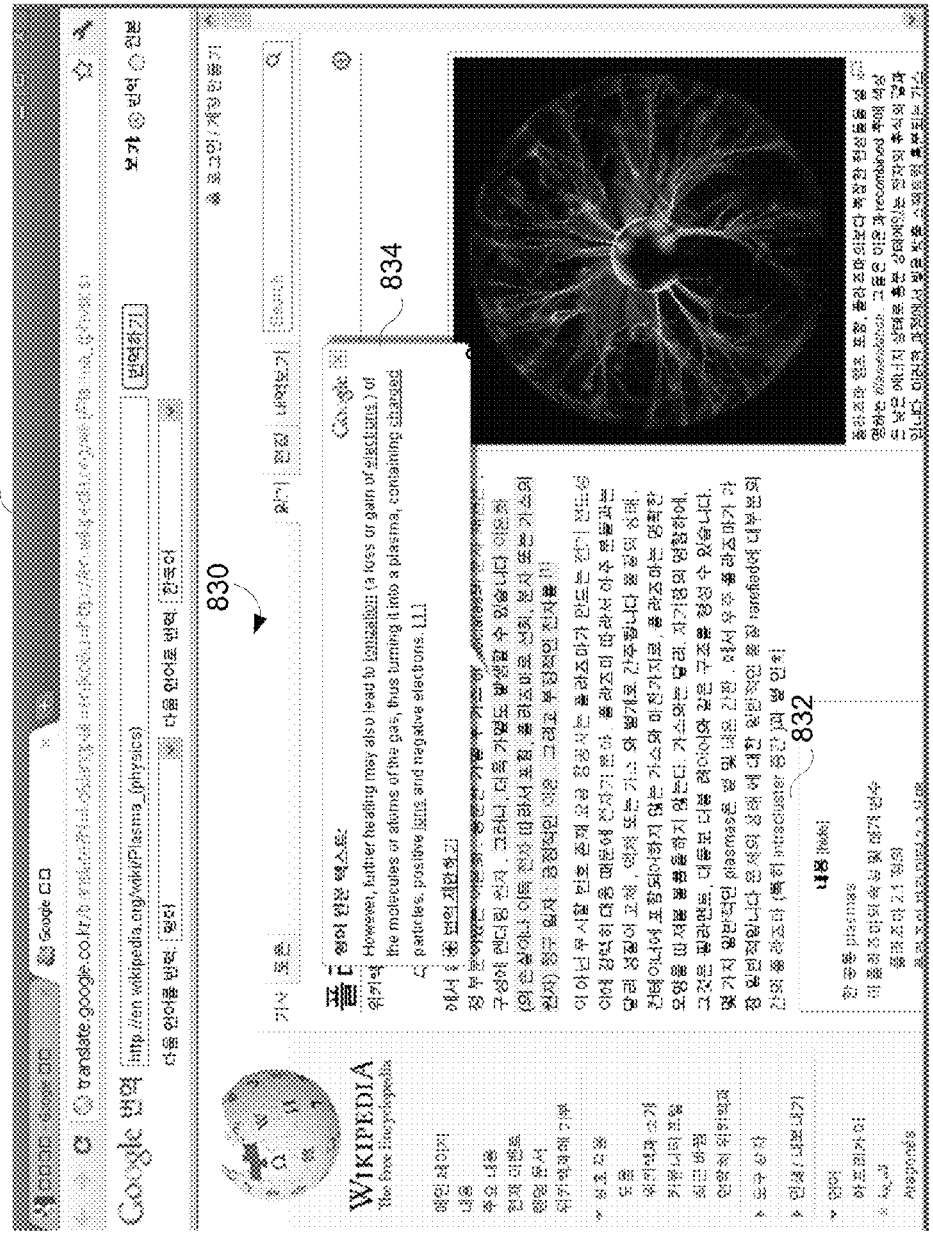

As discussed above with respect to FIG. 7, in response to a user selection of the search results from the translated search query (e.g. clicking a link in the search results), the document referenced by the search result is translated into the application language and displayed to the user. FIG. 8B illustrates an example of translated document 830 in a user interface 800-B provided by the client application 132. The translated document text 832 is displayed to the user in the application language. In some instances, the translated document text 832 contains terms or words that are untranslated. In the example illustrated, the document text 832 contains the untranslated term "intracluster." A text box 834 including the original untranslated text of the document is displayed responsive to user selection of the translated document text 832 (e.g., hovering a mouse over the translated document text 832).

Figure 8C:
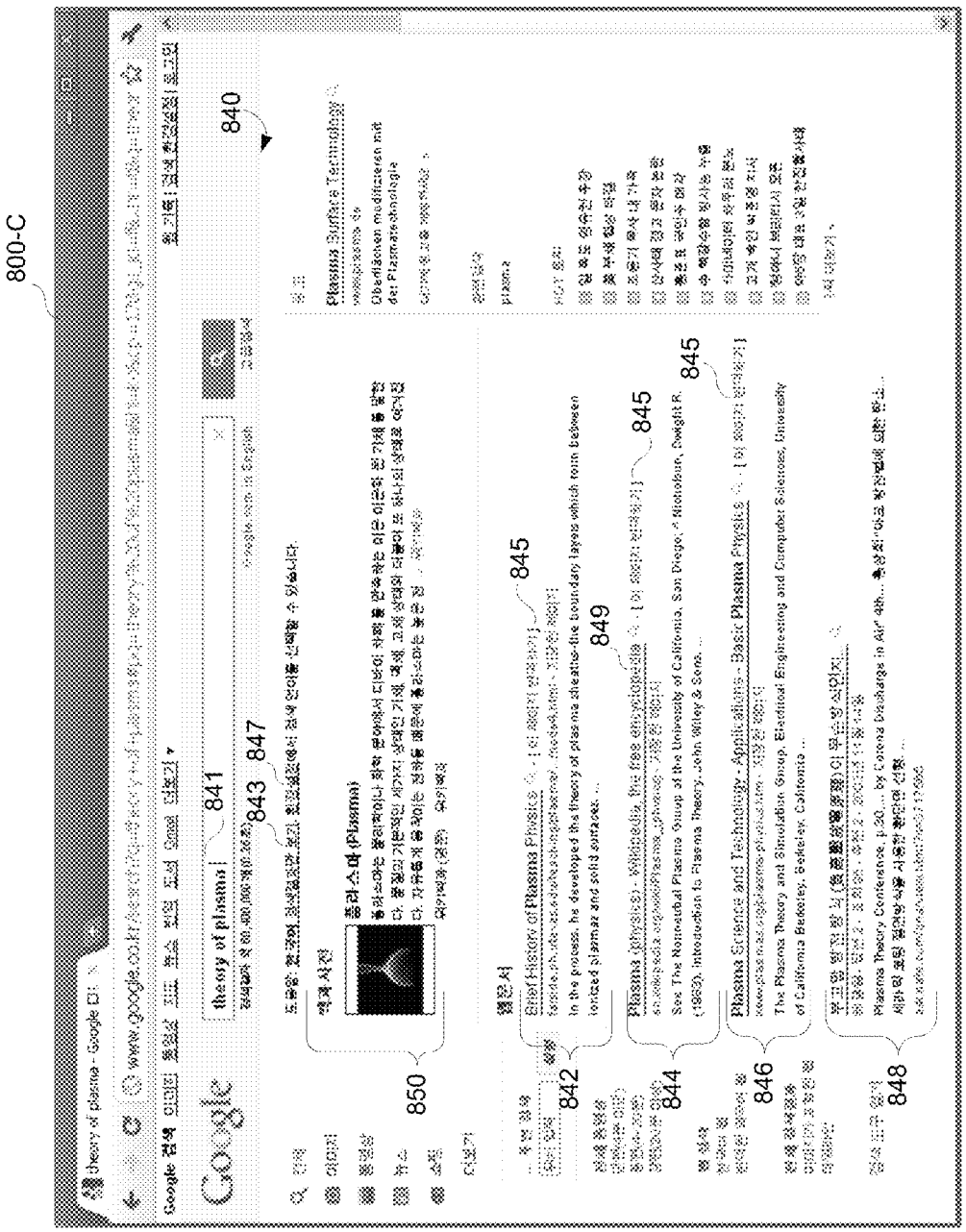

In instances where the search server system 106 presents search results from the original search query without presenting translated search results, original search results can include search results in a language other than the application language. FIG. 8C illustrates a user interface 800-C displaying a search result document 840 that includes search results where the search results from the original query are not translated into the application language. In the example illustrated, some of the search results 842, 844, 846 are in English although the application language is Korean. Other search results 848, 850 are presented in the application language. The document 840 optionally displays a link 843 or affordance that allows the user to specify that they wish to only receive search results in the application language and/or a link 847 or affordance that allows the user to specify language preferences.

Figure 8D:
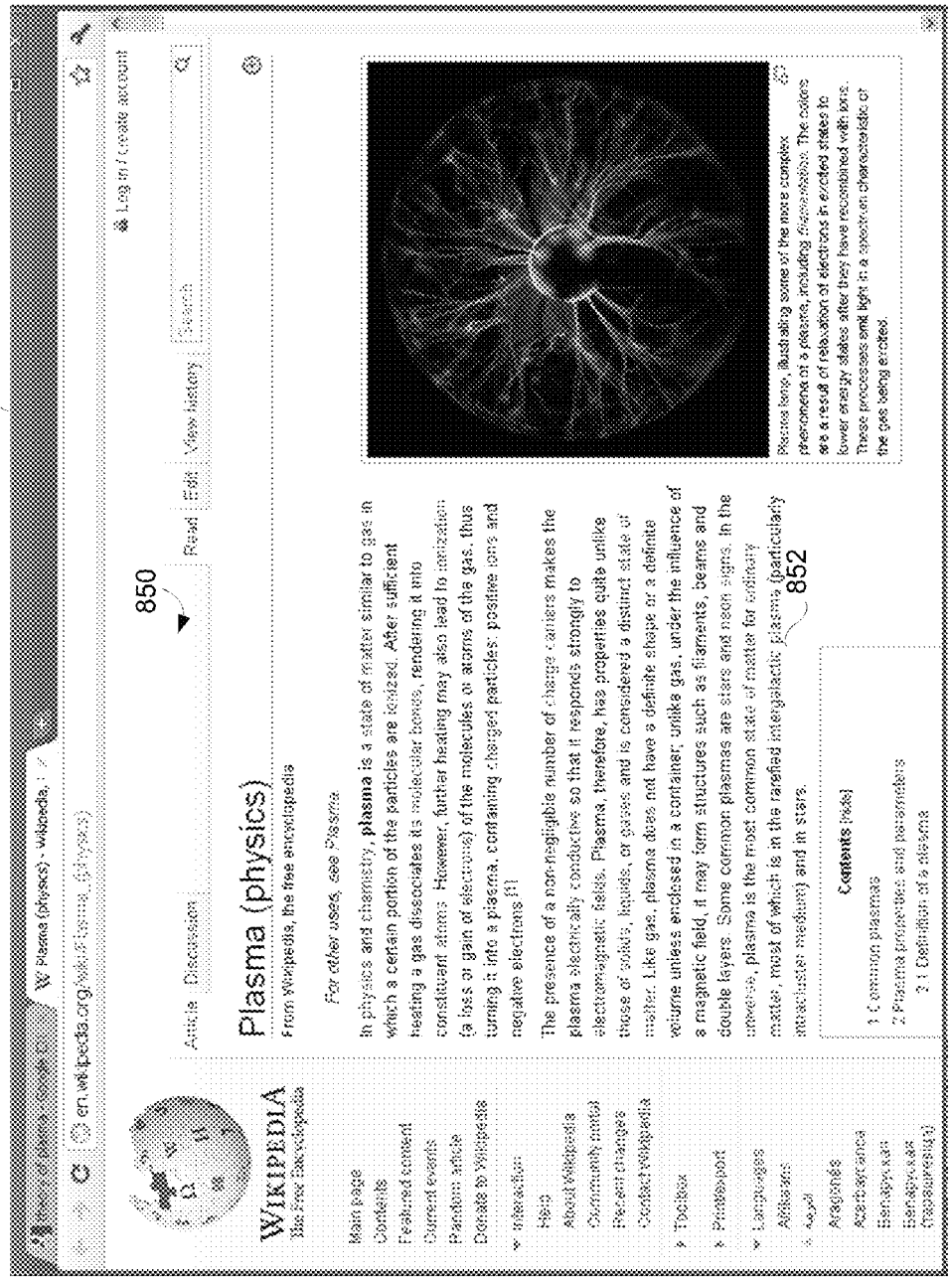

In some implementations, search results not in the application language are displayed with translation links 845, each of which allows the user to request a translation of the corresponding document in the search results. Responsive to clicking a respective translation link 845 (e.g., the translation link associated with search result 844), the search server system 106 translates the corresponding document into the application language. In the example illustrated, search result 844 corresponds to the untranslated version of the document illustrated in FIG. 8B. Responsive to clicking the translation link 845 associated with search result 844, the user is presented with the same translated document illustrated in FIG. 8B. In response to selecting the link 849, positioned at the untranslated document title, the user is presented with a document 850 in the user interface 800-D illustrated in FIG. 8D. The document 850 includes the original untranslated text 852.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing search queries, performed by a search server system having one or more processors and memory storing one or more programs for execution by the one or more processors so as to perform the method, the method comprising:

receiving, from a client system distinct from the search server system, a search query and an indicia of a spoken application language associated with an application used at the client system to perform the search query, the indicia of the spoken application language being based at least in part on a determined locale associated with the client system;

identifying a first spoken language, a first probability factor that specifies a probability that the search query is in the first spoken language, and a second probability factor associated with the determined locale for the client system;

in response to satisfaction of filter criteria for both the first and second probability factors, the filter criteria associated with the first probability factor including a determination that the first spoken language corresponds to the application language and the filter criteria associated with the second probability factor including a determination that the language of the search query is associated with a locale other than the determined locale:

translating the search query into a translated search query in a second spoken language distinct from the application language;

obtaining search results for the translated search query, at least some of the search results including one or more snippets of text from the one or more search results;

translating one or more of the search results and translating the one or more snippets into the application language to produce translated search results; and providing, to the client system, the translated search results and at least one translation link for search results that are in a language other than the application language, each translation link being operable to provide a translated document corresponding to search results that are in the language other than the application language.

2. The method of claim 1, further comprising:
receiving a selection of a translated search result; and
responding to the selection by translating a document corresponding to the selected translated search result, and transmitting the translated document to the client system.

3. The method of claim 1, further comprising:
obtaining, from a search engine, search results for the received search query, the search results for the received search query obtained without using the indicia and without using the determined locale; and
conveying to the client system at least a subset of the search results for the received search query and at least some of the search results for the translated search query,
wherein the search results for the translated search query are obtained from a translation search server associated with the search server system, the translation search server using the indicia and the determined locale to perform the translated search query.

4. The method of claim 1, further comprising:
identifying a plurality of probability factors, wherein the first probability factor has a highest value of the plurality of probability factors, and each of the plurality of probability factors specifies a probability that the search query is in a respective language of a plurality of languages; and
determining whether the filter criteria are satisfied in accordance with two or more of the plurality of probability factors.

5. The method of claim 1, further comprising:
obtaining search results for the received search query; and
in response to a determination that the first spoken language does not correspond to the application language, conveying to the client system at least a subset of search results for the received search query.

6. The method of claim 1, further comprising:
generating the first probability factor, wherein generating the first probability factor comprises weighting the probability factor based on the application language.

7. The method of claim 6, further comprising:
identifying a location of the client system; and
weighting the first probability factor based at least in part on the location associated with the client system.

8. The method of claim 6, wherein generating the first probability factor comprises:
generating a set of n-grams from the received search query;
determining, for each n-gram, a respective probability that the n-gram is in the first language; and
combining the set of respective probabilities to generate the first probability factor.

9. The method of claim 1, further comprising:
identifying a first language and a first probability factor that specifies a probability that the search query is in the first language, wherein satisfaction of the filter criteria comprises a determination that the first language corresponds to the application language.

10. A non-transitory computer readable storage medium storing one or more programs configured for execution by a computer, the one or more programs comprising instructions to:
receive, from a client system distinct from a search server system, a search query and an indicia of an application language associated with an application used at the client system to perform the search query, the indicia of the application language being based at least in part on a determined locale associated with the client system;
identify a first language, a first probability factor that specifies a probability that the search query is in the first language, and a second probability factor associated with the determined locale for the client system;
in response to satisfaction of filter criteria for both the first and second probability factors, the filter criteria associated with the first probability factor including a determination that the first language corresponds to the application language and the filter criteria associated with the second probability factor including a determination that the language of the search query is associated with a locale other than the determined locale:
translate the search query into a translated search query in a second language distinct from the application language;
obtain search results for the translated search query, at least some of the search results including one or more snippets of text from the one or more search results;
translate one or more of the search results and translating the one or more snippets into the application language to produce translated search results; and
provide, to the client system, the translated search results and at least one translation link for search results that are in a language other than the application language, each translation link being operable to provide a translated document corresponding to search results that are in the language other than the application language.

11. The non-transitory computer readable storage medium of claim 10, wherein the one or more programs further comprise instructions to:
receive a selection of a translated search result; and
respond to the selection by translating a document corresponding to the selected translated search result, and transmitting the translated document to the client system.

12. The non-transitory computer readable storage medium of claim 10, wherein the one or more programs further comprise instructions to:
obtain, from a search engine, search results for the received search query, the search results for the received search query obtained without using the indicia and without using the determined locale; and
convey to the client system at least a subset of the search results for the received search query and at least some of the search results for the translated search query,
wherein the search results for the translated search query are obtained from a translation search server associated with the search server system, the translation search server using the indicia and the determined locale to perform the translated search query.

13. The non-transitory computer readable storage medium of claim 12, wherein the one or more programs further comprise instructions to:
in accordance with a determination that the first probability factor falls below a predefined threshold, determine that the filter criteria are not satisfied.

14. The non-transitory computer readable storage medium of claim 13, wherein the one or more programs further comprise instructions to:
identify a plurality of probability factors, each of the plurality of probability factors specifying a probability that the search query is in a respective language of a plurality of languages; and
determine whether the filter criteria are satisfied in accordance with two or more of the plurality of probability factors.

15. A search server system comprising:
one or more processors; and
memory storing one or more programs for execution by the one or more processors so as to:
receive, from a client system distinct from the search server system, a search query and an indicia of an application language associated with an application used at the client system to perform the search query, the indicia of the application language being based at least in part on a determined locale associated with the client system;
identify a first language, a first probability factor that specifies a probability that the search query is in the first language, and a second probability factor associated with the determined locale for the client system;
in response to satisfaction of filter criteria for both the first and second probability factors, the filter criteria associated with the first probability factor including a determination that the first language corresponds to the application language and the filter criteria associated with the second probability factor including a determination that the language of the search query is associated with a locale other than the determined locale:
translate the search query into a translated search query in a second language distinct from the application language;
obtain search results for the translated search query, at least some of the search results including one or more snippets of text from the one or more search results;
translate one or more of the search results and translating the one or more snippets into the application language to produce translated search results; and
provide, to the client system, the translated search results and at least one translation link for search results that are in a language other than the application language, each translation link being operable to provide a translated document corresponding to search results that are in the language other than the application language.

16. The method of claim 1, further comprising:
determining that the search query is in a language other than the application language, and providing at least one additional probability factor indicating that the search query is configured to retrieve search results in the language other than the application language.

17. The non-transitory computer readable storage medium of claim 10, wherein the instructions further comprise:
determining that the search query is in a language other than the application language, and providing at least one additional probability factor indicating that the search query is configured to retrieve search results in the language other than the application language.

18. The non-transitory computer readable storage medium of claim 10, wherein the generating the first probability factor comprises:
generating a set of n-grams from the received search query;
determining, for each n-gram, a respective probability that the n-gram is in the first language; and
combining the set of respective probabilities to generate the first probability factor.

19. The system of claim 15, wherein generating the first probability factor comprises:
generating a set of n-grams from the received search query;
determining, for each n-gram, a respective probability that the n-gram is in the first language; and
combining the set of respective probabilities to generate the first probability factor.

20. The non-transitory computer readable storage medium of claim 10, wherein the instructions further comprise:
identifying a first language and a first probability factor that specifies a probability that the search query is in the first language, wherein satisfaction of the filter criteria comprises a determination that the first language corresponds to the application language.

21. The system of claim 15, wherein the one or more processors are further configured to:
identify a first language and a first probability factor that specifies a probability that the search query is in the first language, wherein satisfaction of the filter criteria comprises a determination that the first language corresponds to the application language.

22. The system of claim 15, wherein the one or more processors are further configured to:
receive a selection of a translated search result; and
respond to the selection by translating a document corresponding to the selected translated search result, and transmitting the translated document to the client system.

23. The system of claim 15, wherein the one or more processors are further configured to:
obtain, from a search engine, search results for the received search query, the search results for the received search query obtained without using the indicia and without using the determined locale; and
convey to the client system at least a subset of the search results for the received search query and at least some of the search results for the translated search query, wherein the search results for the translated search query are obtained from a translation search server associated with the search server system, the translation search server using the indicia and the determined locale to perform the translated search query.

24. The system of claim 15, wherein the one or more processors are further configured to, in accordance with a determination that the first probability factor falls below a predefined threshold, determine that the filter criteria are not satisfied.

25. The method of claim 1, further comprising:
in accordance with a determination that the first probability factor falls below a predefined threshold, determining that the filter criteria are not satisfied.

* * * * *